(12) United States Patent
Fujii et al.

(10) Patent No.: US 6,723,797 B2
(45) Date of Patent: Apr. 20, 2004

(54) CROSSLINKING AGENT FOR WATER-ABSORBING RESIN AND WATER-ABSORBING MATERIAL OBTAINED WITH THE SAME

(75) Inventors: Satoru Fujii, Tatsuno (JP); Yoshiyuki Morita, Tatsuno (JP); Tetsuya Hosomi, Tatsuno (JP); Nobuaki Aoki, Tatsuno (JP)

(73) Assignee: Nagase Chemtex Corporation, Osaka (JP)

( * ) Notice: Subject to any disclaimer, the term of this patent is extended or adjusted under 35 U.S.C. 154(b) by 31 days.

(21) Appl. No.: 10/049,002

(22) Filed: Jun. 4, 2002

(65) Prior Publication Data

US 2002/0185629 A1 Dec. 12, 2002

(30) Foreign Application Priority Data

Jun. 5, 2000 (JP) ........................................ 2000-171989

(51) Int. Cl.$^7$ .............................................. C08F 120/02
(52) U.S. Cl. .................... 525/329.7; 525/206; 525/209; 525/217; 252/182.13; 252/182.14; 252/182.15; 252/182.24; 252/182.23; 252/182.34; 119/166; 119/169; 119/171; 600/362
(58) Field of Search ........................ 252/182.13, 182.14, 252/182.15, 182.24, 182.23, 182.34; 119/166, 169, 171; 600/362; 525/329.7, 206, 209, 217

(56) References Cited

U.S. PATENT DOCUMENTS 5,780,616 A * 7/1998 Fornasari et al. ............. 536/30

FOREIGN PATENT DOCUMENTS

| EP | 668080 | 8/1995 |
|---|---|---|
| JP | 11-349625 | 12/1999 |
| WO | 96/15154 | 5/1996 |

* cited by examiner

Primary Examiner—William Cheung
(74) Attorney, Agent, or Firm—Merchant & Gould P.C.

(57) ABSTRACT

A crosslinking agent for water-absorbing resins which comprises (A) at least one halohydrin compound selected between (A1) a first halohydrin compound having per molecule at least two halohydrin groups (D) represented by the general formula (I), wherein $R_1$ represents hydrogen or alkyl and X represents chlorine or bromine and (A2) a second halohydrin compound having per molecule at least two halohydrin groups (D) represented by the formula (I) and having per molecule at least one ammonium group (M) represented by the general formula (II), wherein $R_2$'s each independently represents a $C_{1-4}$ hydrocarbon group or benzyl.

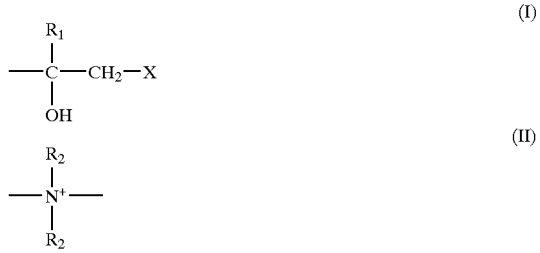

11 Claims, No Drawings

CROSSLINKING AGENT FOR WATER-ABSORBING RESIN AND WATER-ABSORBING MATERIAL OBTAINED WITH THE SAME

TECHNICAL FIELD

The present invention relates to a crosslinking agent for the production of a water absorbing agent by surface-crosslinking of particles of water absorbing resin, a water absorbing agent so obtained, and a method for the production of such a water absorbing agent.

BACKGROUND ART

Water absorbing resins have a high water absorbing capacity and because of this capacity they are in wide use as sanitary or hygienic materials as well as in the fields of food, agriculture and forest industry, or engineering works.

Partially neutralized salts of polyacrylic acid or polymethacrylic acid have been heretofore used as water absorbing resins for sanitary materials in many cases. Water absorbing resins for disposable diapers, among a variety of sanitary materials, are required to have a high water absorbing capacity (water retention) and high speed of water absorption under increased pressures (under a load) as well as under normal pressures (under no load), and besides such performance characteristics are required to be well-balanced.

One of measures to obtain a water absorbing resin having high water absorbing capacity is to increase crosslinking density of the resin. However, as is well-known, for example, a resin obtained by polymerization of acrylic acid and/or its salt (neutralized salt) by using a polyfunctional copolymerizable monomers as an inner crosslinking agent in a large quantity is crosslinked uniformly with high density, and has high water absorbing capacity under a load, but inferior in water absorbing capacity under no load.

In order to solve such problems, a measure is also known in which water absorbing resin particles are surface-crosslinked. According to the method of surface-crosslinking, particles of water absorbing resin which has carboxylic acid groups and/or carboxylic acid salt groups are used as starting materials. The particles are crosslinked mainly at the surface region by using a crosslinking agent to increase the crosslinking degree mainly at the surface region of the particles of the resin so that the particles have a large water absorbing speed while maintaining the crosslinking density low inside the particles so that the particles are not reduced in water absorbing capacity. The crosslinking agent used has at least two reactive groups (functional groups) in the molecule that are capable of reacting with the carboxylic acid groups and/or carboxylic acid salt groups of the particles of the water absorbing.

As such a surface-crosslinking agent used in the surface-crosslinking method as mentioned above, for example, epoxy compounds typified by ethylene glycol diglycidyl ether are proposed in Japanese Patent Application Laid-open No. 57-44627, while polyhydric alcohols typified by ethylene glycol, diethylene glycol or glycerin in Japanese Patent Application Laid-Open No. 58-180223. Besides, polyfunctional amine compounds, polyfunctional aziridine compounds or epoxy compounds having amino groups are proposed in Japanese Patent Application Laid-open No. 63-195205, while the reaction products of epihalohydrin with ammonia or low molecular weight primary amines such as ethylenediamine in Japanese Patent Application Laid-open No. 2-248404.

When an alcohol such as glycerin or an amine is used as a crosslinking agent in the surface-crosslinking method, the surface-crosslinking reaction of water absorbing resin particles must be carried out usually at a temperature as high as 180° C. However, the surface-crosslinking reaction at such a high temperature causes thermal crosslinking or thermal deterioration of water absorbing resin itself to make it difficult to control the crosslinking degree of resin particles, and the resulting water absorbing agent is deteriorated in absorbing capacity and speed instead of being improved in such performance.

On the other hand, crosslinking agents such as epoxy compounds (i.e., ethylene glycol diglycidyl ether), epoxy compounds having amino groups in the molecule, amine compounds, aziridine compounds or isocyanate compounds irritate the skin. Accordingly, there arises a problem of safety when such a crosslinking agent is used for the production of water absorbing agent for sanitary materials for infants as it is possible that part of the crosslinking agent remains unreacted and persists on the absorbing agent and makes contact with the skin of infants.

The reaction product of an epihalohydrin with ammonia or a low molecular weight primary amine such as ethylenediamine is a simple adduct formed by the addition of amine to the epoxy group of the epihalohydrin and has no reactive functional group in the molecule so that it cannot achieve effective crosslinking even under heating and improvement in water absorbing speed.

The invention has been accomplished to solve the above-mentioned problems involved in the production of a water absorbing agent by the conventional surface-crosslinking of water absorbing resin particles. Accordingly, it is an object of the invention to provide a crosslinking agent for use in the production of water absorbing agent by surface-crosslinking or inner-crosslinking of water absorbing resin particles. It is a further object of the invention to provide a water absorbing agent obtained by using such a crosslinking agent and a method for the production of such a water absorbing agent.

More specifically, it is an object of the invention to provide a surface-crosslinking agent that is safely used since it has no epoxy groups in the molecule and that crosslinks the surface region of water absorbing resin particles at lower temperatures more effectively than the conventional surface-crosslinking agents such as alcohols or amines, thereby providing a water absorbing agent which is superior in water absorbing capacity especially under a load, and preferably either under no load or under a load. It is still an object of the invention to provide a water absorbing agent obtained by using such a crosslinking agent and a method for the production of such a water absorbing agent.

It is a further object of the invention to provide an inner crosslinking agent for use in the production of water absorbing agent by inner-crosslinking of water absorbing resin particles.

DISCLOSURE OF THE INVENTION

The invention provides a crosslinking agent for use in the crosslinking of water absorbing resin particles which comprises at least one halohydrin compound (A) selected from the group consisting of:

(A1) a first halohydrin compound (A1) which has in the molecule at least two halohydrin groups D having the general formula (I)

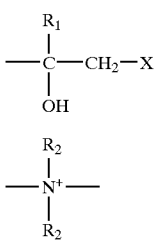

(I)

(II)

wherein $R_1$ is a hydrogen atom or an alkyl group, and X is a chlorine atom or a bromine atom; and (A2) a second halohydrin compound (A2) which has in the molecule at least two the said halohydrin groups D and at least one ammonium group M having the general formula (II)

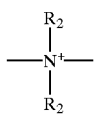

(II)

wherein $R_2$ is independently a hydrocarbon group of 1–4 carbon atoms or a benzyl group.

In particular, it is preferred that the halohydrin compound (A) has, as the above-mentioned halohydrin group D, a halohydrin group Da having the general formula (Ia)

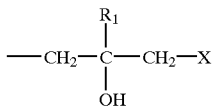

(Ia)

wherein $R_1$ a is hydrogen atom or an alkyl group, and X is a chlorine atom or a bromine atom.

The invention further provides a water absorbing agent obtained by adding 0.01–20 parts by weight of the above-mentioned crosslinking agent to 100 parts by weight of particles of water absorbing resin which has carboxylic acid groups and/or carboxylic acid salt groups, and heating the resulting mixture to crosslink the particles of the water absorbing resin.

The invention still further provides a method for the production of a water absorbing agent which comprises adding 0.01–20 parts by weight of the above-mentioned crosslinking agent to 100 parts by weight of particles of water absorbing resin which has carboxylic acid groups and/or carboxylic acid salt groups, and heating the resulting mixture to crosslink the particles of the water absorbing resin.

BEST MODE FOR CARRYING OUT THE INVENTION

The crosslinking agent of the invention for use in the crosslinking of particles of water absorbing resin (referred to simply as the crosslinking agent hereunder) is suitable for use as a surface-crosslinking agent to crosslink the surface region of water absorbing resin particles, however, it is also suitable for use as an inner crosslinking agent.

According to the invention, when water absorbing resin particles are used as a starting material, and when the water absorbing agent of the invention is to be obtained by surface-crosslinking of the water absorbing resin particles, any of the water absorbing resin particle may be used so long as the resin has carboxylic acid groups and/or carboxylic acid salt groups, absorbs water, swells and form hydrogel. Therefore, such water absorbing resins are exemplified by partially neutralized crosslinked polyacrylic acid, self-crosslinked partially neutralized polyacrylic acid, crosslinked starch-acrylic acid salt graft copolymer, hydrolyzed crosslinked starch-acrylonitrile graft copolymer, crosslinked vinyl alcohol-acrylic acid salt copolymer, crosslinked acrylic acid salt-acrylamide copolymer, hydrolyzed acrylic acid salt-acrylonitrile copolymer, or crosslinked acrylic acid salt-2-acrylamide-2-methyl-propanesulfonic acid salt. These resins may be used singly or as a mixture of two or more.

From the standpoint of water absorbing capacity of the water absorbing agent obtained, particles of water absorbing resin which has carboxylic acid groups and/or carboxylic acid salt groups at high density such as partially hydrolyzed crosslinked polyacrylic acid or self-crosslinked polyacrylic acid is especially preferred as the starting material. The carboxylic acid salt group used includes, for example, sodium salt group, potassium salt group or ammonium salt group, and sodium salt group is most preferred.

The water absorbing resin particles used are not specifically limited in their shapes and methods for production, and accordingly they may be pearl-like particles of resins obtained by a reversed phase suspension polymerization method, or scaly, lump, massive, granular or amorphous particles of resins obtained by pulverizing dried products of aqueous solution polymerization. The water absorbing resin particles used may be a granulated product of water absorbing resins.

The particle size of water absorbing resin is not also specifically limited, and it is usually in the range of 40–140 meshes. Fine particles having a large specific surface area have too high a water absorbing speed so that they obstruct diffusion of urine to lateral direction when they are used for sanitary materials such as disposal diapers. Besides, fine particles easily escape from a pulp layer that forms a substrate material of sanitary materials. Accordingly, a water absorbing resin for use in sanitary materials is preferably such that the proportion of the particles having a particle size of 20–60 meshes is 70% by weight or more of the total particles. Especially, such particles are preferred that the proportion of the particles having a particle size of 20–42 meshes is 70% by weight or more of the total particles.

The crosslinking agent of the invention comprises at least one halohydrin compound (A) selected from the group consisting of:

(A1) a first halohydrin compound (A1) which has in the molecule at least two halohydrin groups D having the general formula (I)

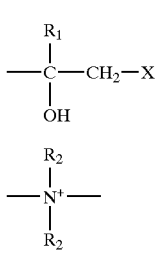

(I)

(II)

wherein $R_1$ is a hydrogen atom or an alkyl group, and X is a chlorine atom or a bromine atom; and (A2) a second halohydrin compound (A2) which has in the molecule at least two the said halohydrin groups D and at least one ammonium group M having the general formula (II)

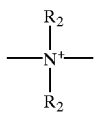

(II)

wherein $R_2$ is independently a hydrocarbon group of 1–4 carbon atoms or a benzyl group.

In the halohydrin group D represented by the general formula (I), when $R_1$ is an alkyl group, it is preferably an alkyl group having 1–4 carbon atoms, and more preferably a methyl group. However, most preferably, $R_1$ is a hydrogen atom.

In particular, it is preferred that the halohydrin compound (A) has, as the halohydrin group D, a halohydrin group Da having the general formula (Ia)

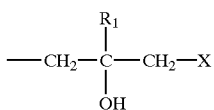

(Ia)

wherein $R_1$ is a hydrogen atom or an alkyl group, and X is a chlorine atom or a bromine atom.

Herein the present invention, the halohydrin group D is a halohydrin group in a wide sense and the halohydrin group Da is a halohydrin group in a narrow sense. Thus, it is preferred that either the first halohydrin compound (A1) or the second halohydrin compound (A2) or both the first and the second halohydrin compounds have, as the halohydrin group D, the halohydrin group in a narrow sense which is represented by the general formula (Ia).

In the ammonium group M represented by the general formula (II), when $R_2$ is a hydrocarbon group of 1–4 carbon atoms, $R_2$ is preferably (a) an alkyl group of 1–4 carbon atoms, or (b) an alkyl group of 1–4 carbon atoms carrying hydroxyl groups or cyano groups, or (c) an unsaturated alkyl group of 1–4 carbon atoms, and in particular, $R_2$ is preferably a methyl group.

According to the invention, among the halohydrin compounds (A), the first halohydrin compound (A1) is preferably at least one selected from the group consisting of:

(A1a) a compound (A1a) represented by the general formula (III)

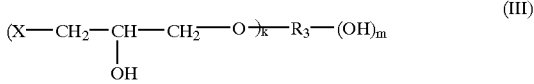

(III)

wherein $R_3$ is an aliphatic hydrocarbon group of 2–10 carbon atoms having a valence of (k+m); X represents a chlorine atom or a bromine atom; and k and m are integers satisfying the conditions: $2 \leq k \leq 6$, $0 \leq m \leq 4$, and $2 \leq k+m \leq 6$;

(A1b) a compound (A1b) represented by the general formula (IV)

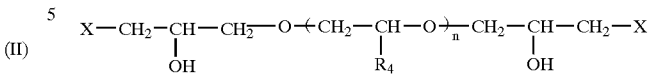

(IV)

wherein $R_4$ is a hydrogen atom or an alkyl group; X represents a chlorine atom or a bromine atom; and n is an integer of 1–50;

(A1c) a compound (A1c) represented by the general formula (V)

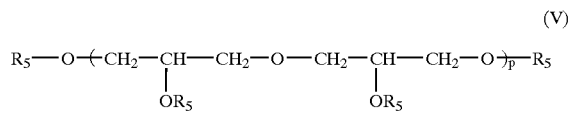

(V)

wherein $R_5$ is independently a hydrogen atom or a halohydrin group Da, and at least two of $R_5$ are halohydrin groups Da; and p is an integer of 1–10; and (A1d) a compound (A1d) obtained by reacting a sugar alcohol from oligosaccharides and having at least two halohydrin groups Da in the molecule.

In the halohydrin compound (A1c) represented by the general formula (V), the halogen atom is a chlorine atom or a bromine atom.

The first halohydrin compound (A1) is in general obtained by reacting a compound which has at least two hydroxyl groups in the molecule (referred to as the polyhydric alcohol hereunder) corresponding to the halohydrin compound (A1a), (A1b), (A1c) or (A1d) with an epihalohydrin.

Thus, the halohydrin compound (A1a) is obtained by reacting a compound having the general formula (IX)

$$R_3\text{---}(OH)_{k+m} \quad (IX)$$

wherein $R_3$, k and m are the same as above, as the polyhydric alcohol with an epihalohydrin. The aliphatic hydrocarbon group $R_3$ is a residual group of an aliphatic polyhydric alcohol, as will be apparent from the examples of the polyhydric alcohols mentioned hereunder.

The halohydrin compound (A1b) is obtained by reacting a compound having the general formula (X)

(X)

wherein $R_4$ and n are the same as above, as the polyhydric alcohol with an epihalohydrin. The group $R_4$ in the polyhydric alcohol represented by the general formula (X) is preferably a hydrogen atom or a methyl group, and n is preferably one or two, and most preferably two.

The halohydrin compound (A1c) is obtained by reacting a compound having the general formula (XI)

(XI)

wherein p is the same as above, as the polyhydric alcohol with an epihalohydrin. The subscript p in the polyhydric alcohol represented by the general formula (XI) is preferably one.

The halohydrin compound (A1d) is obtained by reacting a sugar alcohol obtained from oligosaccharides as a polyhydric alcohol with an epihalohydrin.

The polyhydric alcohol represented by the general formula (IX) includes such sugar alcohols that are obtained by the reduction of monosaccharides. Examples of such polyhydric alcohols are 1,2-propanediol, 1,3-propanediol, 1,2-butanediol, 1,4-butanediol, 1,6-hexanediol, glycerin, trimethylolethane, trimethylolpropane, erythritol, pentaerythritol, sorbitol, mannitol and xylitol, although the polyhydric alcohols usable are not limited to these examples. However, among these examples, trimethylolethane, sorbitol or mannitol is particularly preferred.

The polyhydric alcohol represented by the general formula (X) is exemplified by, for example, ethylene glycol, diethylene glycol, triethylene glycol, polyethylene glycol, propylene glycol, dipropylene glycol or polypropylene glycol, although the polyhydric alcohols usable are not limited to these exemplified. However, among these examples, diethylene glycol or dipropylene glycol is particularly preferred.

The polyhydric alcohol represented by the general formula (XI) is exemplified by, for example, diglycerine or polyglycerine, although the polyhydric alcohols usable are not limited to these exemplified. However, among these examples, diglycerine is particularly preferred.

In turn, the sugar alcohol from the oligosaccharides includes, for example, a sugar alcohol which is obtained by the reduction of disaccharides such as malt sugar (maltose), cellobiose, cane sugar (sucrose) or milk sugar (lactose) or trisaccharides such as raffinose or melezitose, or reduced starch sugar obtained by the reduction of starch sugar, although the sugar alcohols usable are not limited to these exemplified. The sugar alcohol may be used singly or as a mixture of two or more of these, if necessary, together with sugar alcohols from monosaccharides.

On the other hand, as an epihalohydrin to be reacted with such polyhydric alcohols as mentioned above, epichlorohydrin or epibromoydrin is preferably used.

According to the invention, however, for example, maltitol (a sugar alcohol from maltose) which is readily available as a commercial product is used preferably.

The reaction of various polyhydric alcohols as mentioned above with an epihalohydrin may be carried out by adding the epihalohydrin dropwise to the polyhydric alcohol in the presence of a Lewis acid catalyst preferably with heating (for example, at a temperature in the range of 30–95° C.), if necessary in a solvent, and stirring the resulting mixture. Boron trifluoride ether complex, stannic chloride, zinc borofluoride, titanium tetrachloride, zinc chloride, silica alumina or antimony pentachloride may be used as a Lewis acid catalyst, for example, although not limited to these exemplified.

The solvent is used when necessary to control the reaction or adjust the viscosity of the reaction mixture, and any solvent may be used so long as it is inactive to the reaction of the polyhydric alcohols with the epihalohydrin. Accordingly, the solvent usable includes, for example, an aromatic hydrocarbon such as toluene or xylene, an aliphatic hydrocarbon such as hexane or heptane, or ethers such as diethyl ether, diisopropyl ether, ethylene glycol dimethyl ether, diethylene glycol dimethyl ether or dioxane.

In the reaction of polyhydric alcohol with an epihalohydrin, the latter is used usually in an amount of 30–200 mol %, preferably in an amount of 50–150 mol %, in relation to the amount of hydroxyl groups of the polyhydric alcohol used. When an epihalohydrin is used in an amount of not more than 30 mol % in relation to the amount of hydroxyl groups of the polyhydric alcohol used, the resulting polyhalohydrin compound contains too small an amount of halohydrin groups. Accordingly, if such a polyhalohydrin compound is used as a crosslinking agent to effect surface-crosslinking of water absorbing resin particles, the particles are crosslinked only with a small crosslinking density and are not improved enough in water absorbing capacity. On the other hand, when an epihalohydrin is used in an amount of more than 200 mol % in relation to the amount of hydroxyl groups of the polyhydric alcohol used, a portion of unreacted epihalohydrin remains in the resulting polyhalohydrin compound. This is uneconomical, but also undesirable from the viewpoint of safety when the resulting crosslinking agent is used as a surface-crosslinking agent of water absorbing resin particles.

According to the invention, the second halohydrin compound (A2) is preferably a compound which has quaternary ammonium groups and two or more halohydrin groups Da in the molecule and which is represented by the general formula (VI)

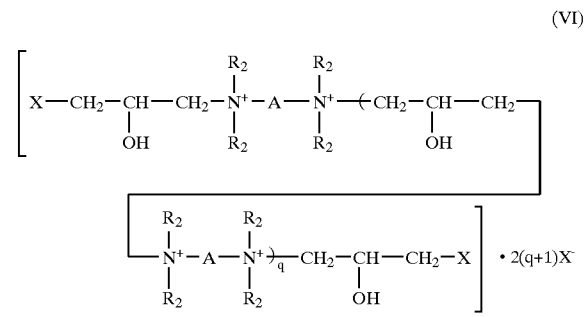

wherein A is an alkylene group of 2–8 carbon atoms; or a divalent group N represented by the general formula (VII)

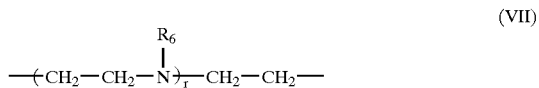

wherein $R_6$ is a hydrocarbon group of 1–4 carbon atoms or a benzyl group, and r is an integer of 1–3; or a divalent group O represented by the formula (VIII)

and wherein $R_2$ is each independently a hydrocarbon group of 1–4 carbon atoms or a benzyl group: X is a chlorine atom or a bromine atom; and q is an integer of 0–5.

In the compound represented by the general formula (VI), when $R_2$ is a hydrocarbon group of 1–4 carbon atoms, $R_2$ is preferably (a) an alkyl group of 1–4 carbon atoms, (b) an alkyl group of 1–4 carbon atoms which carries a hydroxyl group or a cyano group, or (c) an unsaturated alkyl group of 1–4 carbon atoms, and most preferably a methyl group.

Among the second halohydrin compounds (A2) as mentioned above, such a halohydrin compound as represented by the general formula (VI) in which A is an alkylene group of 2–8 carbon atoms or a divalent group N represented by the general formula (VII) is obtained by the reaction of a tertiary amine compound represented by the general formula (XII)

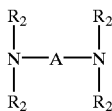

wherein A is an alkylene group of 2–8 carbon atoms or the aforesaid divalent group N represented by the general formula (VII)

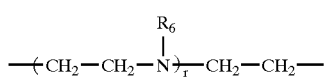

wherein $R_6$ is a hydrocarbon group of 1–4 carbon atoms or a benzyl group; r is an integer of 1–3; and $R_2$ is each independently a hydrocarbon group of 1–4 carbon atoms or a benzyl group, with an epihalohydrin or 1,3-dihalo-2-propanol.

By way of example, as described hereunder in more detail, when N,N,N',N'-tetramethyl-1,2-diaminoethane is employed as the tertiary amine compound, one molar part of this compound is reacted with two or more molar parts of epihalohydrin or 1,3-dihalo-2-propanol. On the other hand, when N,N,N',N',N''-pentamethyldiethylenetriamine is employed as the tertiary amine compound, one molar part of this compound is reacted with more than three molar parts of epihalohydrin or 1,3-dihalo-2-propanol.

In the tertiary amine compound represented by the general formula (XII), $R_2$ is the same as hereinbefore mentioned. Accordingly, the tertiary amine compound usable is exemplified by N,N,N',N'-tetramethyl-1,2-diaminoethane, N,N,N',N'-tetramethyl-1,2-diaminopropane, N,N,N',N'-tetramethyl-1,3-diaminopropane, N,N,N,N'-tetramethyl-1,4-diaminobutane, N,N,N',N'-tetraallyl-1,4-diaminobutane, N,N,N',N'-tetramethyl-1,6-diaminohexane, N,N,N',N'-tetra-(hydroxyethyl)-1,3-diaminopropane, or N,N,N',N',N''-pentamethyldiethylenetriamine. Among these are preferred, for instance, N,N,N',N'-tetra-methyl-1,2-diaminoethane or N,N,N',N'-tetramethyl-1,6-diaminohexane.

As an epihalohydrin, epichlorohydrin or epibromohydrin is preferably used, as hereinbefore mentioned, while 1,3-dichloro-2-propanol or 1,3-dibromo-2-propanol, for example, is preferably used as 1,3-dihalo-2-propanol.

The reaction of the tertiary amine compound with an epihalohydrin or 1,3-dihalo-2-propanol is carried out by adding the epihalohydrin or 1,3-dihalo-2-propanol dropwise to the tertiary amine compound preferably with heating (for example, at a temperature of 30–95° C.), if necessary, in the presence of a reaction solvent comprising water, a hydrophilic organic solvent or a mixture of these, and stirring the mixture. When an epihalohydrin is used, the tertiary amine compound is reacted with the epihalohydrin in the presence of a concentrated aqueous solution of hydrochloric acid or hydrobromic acid in an amount equimolar to the epihalohydrin used.

The hydrophilic organic solvent used in the reaction includes, for example, lower aliphatic alcohols such as methanol, ethanol or isopropyl alcohol, ethers such as tetrahydrofuran or dioxane, glycol esters such as ethylcellosolve, or amides such as dimethylformamide.

In the reaction of the tertiary amine compound with an epihalohydrin or 1,3-dihalo-2-propanol, the epihalohydrin or 1,3-dihalo-2-propanol is used usually in an amount of 30–200 mol %, preferably 50–150 mol %, in relation to the amount of tertiary amino groups of the tertiary amine compound. When the epihalohydrin or 1,3-dihalo-2-propanol is used in an amount of not more than 30 mol % in relation to the amount of tertiary amino groups of the tertiary amine compound used, the resulting polyhalohydrin compound contains too small an amount of halohydrin groups. Accordingly, if such a polyhalohydrin compound is used as a crosslinking agent to effect surface-crosslinking of water absorbing resin particles, the particles are crosslinked only with a small crosslinking density and are not improved enough in water absorbing capacity. On the other hand, when the epihalohydrin or 1,3-dihalo-2-propanol is used in an amount of more than 200 mol % in relation to the amount of tertiary amino groups of the tertiary amine compound used, unreacted epihalohydrin remains in the resulting polyhalohydrin compound. This is uneconomical, but also undesirable from the viewpoint of safety when the resulting crosslinking agent is used as a surface-crosslinking agent of water absorbing resin particles.

On the other hand, among the second halohydrin compounds (A2), the compound having the general formula (VI) in which A is the divalent group O represented by the general formula (VIII) is a compound represented by the general formula (XIII)

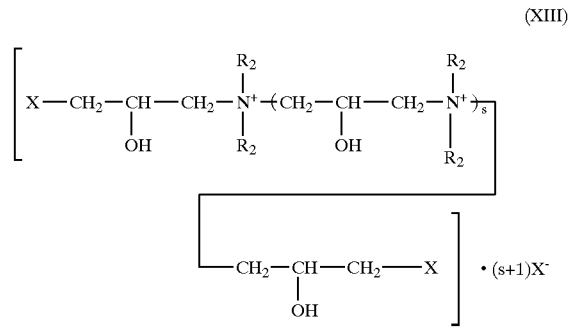

wherein $R_2$ is each independently a hydrocarbon group of 1–4 carbon atoms or a benzyl group; X is a chlorine atom or a bromine atom; and s is an integer of 0–10, as is readily derived from the general formula (VI). The integer s is preferably in the range of 0 to 5.

Thus, the compound represented by the general formula (XIII) is obtained by the reaction of a secondary amine represented by the general formula (XIV)

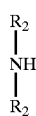

wherein $R_2$ is each independently a hydrocarbon group of 1–4 carbon atoms or a benzyl group, with an epihalohydrin or a 1,3-dihalo-2-propanol.

For example, when a dialkyl amine is used as a secondary amine, the secondary amine is reacted with an epihalohydrin or a 1,3-dihalo-2-propanol. In the compound represented by the general formula (XIII), the group $R_2$ is the same as before mentioned, and is preferably a methyl group. Accordingly, dimethylamine is preferred as the secondary amine, while epichlorohydrin or epibromohydrin is preferred as an epihalohydrin, as mentioned hereinbefore. As a 1,3-dihalo-2-propanol is used 1,3-dichloro-2-propanol or 1,3-dibromo-2-propanol.

The reaction of secondary amine and an epihalohydrin or a 1,3-dihalo-2-propanol is carried out by adding the epihalohydrin or 1,3-dihalo-2-propanol dropwise to the secondary amine preferably with heating (for example, at a temperature of 30–95° C.), if necessary in the presence of a reaction solvent which comprises water, such a hydrophilic organic solvent as mentioned hereinbefore or a mixture of these and stirring the mixture.

In the reaction of the secondary amine compound with an epihalohydrin or a 1,3-dihalo-2-propanol, the epihalohydrin or 1,3-dihalo-2-propanol is used usually in an amount of 30–200 mol %, preferably 50–150 mol %, in relation to the amount of the amino groups of the secondary amine compound. When the epihalohydrin or 1,3-dihalo-2-propanol is used in an amount of not more than 30 mol % in relation to the amount of the amino groups of the secondary amine compound used, the resulting polyhalohydrin compound contains too small an amount of halohydrin groups. Accordingly, if such a polyhalohydrin compound is used as a crosslinking agent to effect surface-crosslinking of water absorbing resin particles, the particles are crosslinked only with a small crosslinking density and are not improved enough in water absorbing capacity. On the other hand, when the epihalohydrin or 1,3-dihalo-2-propanol is used in an amount of more than 200 mol % in relation to the amount of the amino groups of the secondary amine compound used, unreacted epihalohydrin remains in the resulting polyhalohydrin compound. This is uneconomical, but also undesirable from the viewpoint of safety when the resulting crosslinking agent is used as a surface-crosslinking agent of water absorbing resin particles.

As described above, the crosslinking agent of the invention comprises at least one halohydrin compound (A) selected from the first halohydrin compound (A1) and the second halohydrin compound (A2). According to the invention, such a halohydrin compound is used usually in an amount of 0.01–20 parts by weight, preferably in an amount of 0.05–10 parts by weight, most preferably in an amount of 0.1–5 parts by weight, in relation to 100 parts by weight of water absorbing resin particles, although depending on the kind of water absorbing resin particles used and the crosslinking degree of the particles used as well as the desired degree of surface-crosslinking at which degree the particles are to be surface-crosslinked in order to surface-crosslink the water absorbing resin particles thereby providing a water absorbing agent. When the halohydrin compound is used in an amount of less than 0.01 parts by weight in relation to 100 parts by weight of water absorbing resin particles, the particles are not crosslinked enough, whereas when the halohydrin compound is used in an amount of more than 20 parts by weight, the particles are crosslinked at too high a crosslinking density so that the resulting water absorbing agent is inferior either in water absorbing capacity or water absorbing speed.

The crosslinking agent of the invention preferably comprises a combination of the first halohydrin compound (A1) and the second halohydrin compound (A2). When the first halohydrin compound (A1) and the second halohydrin compound (A2) are used in combination in this way as a crosslinking agent for water absorbing resin particles, they are used in a total of the first halohydrin compound (A1) and the second halohydrin compound (A2) in an amount of 0.01–20 parts by weight, preferably in an amount of 0.05–10 parts by weight, most preferably in an amount of 0.1–5 parts by weight, in relation to 100 parts by weight of water absorbing resin particles, although depending on the kind of water absorbing resin particles used and the crosslinking degree of the particles used as well as the desired degree of surface-crosslinking at which degree the particles are to be surface-crosslinked in order to surface-crosslink the water absorbing resin particles thereby providing a water absorbing agent.

When the first halohydrin compound (A1) and the second halohydrin compound (A2) are used in total in an amount of less than 0.01 part by weight in relation to 100 parts by weight of water absorbing resin particles, the particles are not crosslinked enough, whereas when they are used in an amount of more than 20 parts by weight, the particles are crosslinked at too high a crosslinking density so that the resulting water absorbing agent is inferior either in water absorbing capacity or water absorbing speed.

When the first halohydrin compound (A1) and the second halohydrin compound (A2) are used in combination as a crosslinking agent, the proportion of the first and the second halohydrin compound is not specifically limited, but it is preferred that the crosslinking agent comprises 10–90% by weight of the first halohydrin compound (A1) and 90–10% by weight of the second halohydrin compound (A2), and it is most preferred that the crosslinking agent comprises 40–60% by weight of the first halohydrin compound (A1) and 60–40% by weight of the second halohydrin compound (A2), so that the resulting water absorbing agent is superior in balance of water absorbing capacity and water absorbing speed.

In the production of water absorbing agent by surface-crosslinking of water absorbing resin particles by using the crosslinking agent of the invention, it is preferred that the surface-crosslinking is carried out in the presence of a solvent comprising of water, a hydrophilic organic solvent or a mixture of these. The hydrophilic organic solvent usable includes, for example, lower aliphatic alcohols such as methanol, ethanol, n-propyl alcohol or isopropyl alcohol, ketones such as acetone, ethers such as dioxane, tetrahydrofuran or methoxy (poly) ethylene glycol, or amides such as ε-caprolactam or N,N-dimethylformamide.

The solvent is used usually in an amount of 0.1–20 parts by weight, preferably in an amount of 0.5–10 parts by weight, in relation to 100 parts by weight of solid content of water absorbing resin particles used, depending on the kind of water absorbing resin particles used or their diameters or water content.

When the surface-crosslinking of water absorbing resin particles is effected, any surface-crosslinking agent which has hitherto been known, such as a polyhydric alcohol compound, an epoxy compound, a polyfunctional amine compound, a polyisocyanate compound, a polyfunctional oxazoline compound, an alkylene carbonate compound, a haloepoxy compound, a silane coupling agent or a polyvalent metal compound may be used jointly.

More concretely, the polyhydric alcohol compound usable includes, for example, ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerin, polyglycerine, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylene block copolymer, pentaerythritol or sorbitol.

The epoxy compound usable includes, for example, ethylene glycol diglycidyl ether, polyethylene glycol diglycidyl ether, glycerine polyglycidyl ether, diglycerine polyglycidyl ether, propylene glycol diglycidyl ether, polypropylene glycol diglycidyl ether or glycidol.

The polyfunctional amine compound usable includes, for example, ethylenediamine, diethylenetriamine, triethylenetetramine, tetraethylenepentamine, pentaethylenehexamine or polyethyleneimine. Inorganic salts or organic salts (such as azetidinium salt) may also be used as a crosslinking agent.

The polyisocyanate compound usable includes, for example, 2,4-tolylene diisocyanate or hexamethylene diisocyanate, while the polyfunctional oxazoline compound usable includes, for example, 1,2-ethylenebisoxazoline.

The alkylene carbonate usable includes, for example, 1,3-dioxolane-2-on, 4-methyl-1,3-dioxolane-2-on, 4,5-dimethyl-1,3-dioxolane-2-on, 4,4-dimethyl-1,3-dioxolane-2-on, 4-ethyl-1,3-dioxolane-2-on, 4-hydroxymethyl-1,3-dioxolane-2-on, 1,3-dioxane-2-on, 4methyl-1,3-dioxane-2-on or 4,6-dimethyl-1,3-dioxane-2-on.

As the haloepoxy compound, there may be mentioned, for example, epichlorohydrin, epicbromohydrin or α-methylepichlorohydrin, or their amine adducts (for example, "Kimen" (available from Hercules, registered trademark).

In addition, silane coupling agents such as γ-glycidoxypropyltrimethoxysilane or γ-aminopropyltriethoxysilane, various compounds, such as hydroxides or chlorides, of polyvalent metals, for instance, zinc, calcium, magnesium, aluminum, iron or zirconium may also be used as a crosslinking agent.

In order to mix water absorbing resin particles with a crosslinking agent, for example, an aqueous solution of crosslinking agent is sprayed on the particles, and then mixed with a means such as a cylinder mixer, a V-shaped mixer, a ribbon mixer, a screw mixer, double arm mixer or a crushing kneader. If necessary, water absorbing resin particles are mixed with a crosslinking agent in the presence of a surfactant. However, the method and means to mix water absorbing resin particles with a crosslinking agent are not specifically limited to the exemplified as above.

According to the invention, after water absorbing resin particles are mixed with a crosslinking agent, as mentioned above, and the resulting mixture is heated usually at a temperature in the range of 40–250° C. to effect surface-crosslinking of the particles, thereby providing a water absorbing agent of the invention. When the heating temperature is lower than 40° C., the water absorbing resin particles are not crosslinked evenly at the surface region. Thus, the resulting water absorbing agent is not well balanced in, for example, water absorbing capacity under normal pressures and under a load. However, when the heating temperature is higher than 250° C., the water absorbing resin particles used are deteriorated and there is a fear that the resulting water absorbing agent is inferior in water absorbing capacity.

However, since the crosslinking agent of the reaction is highly reactive, it carries out the surface-crosslinking of water absorbing resin particles promptly and evenly at relative low temperatures. Accordingly, the heating temperature is preferably in the range of 60–200° C., and more preferably in the range of 70–200° C.

The water absorbing agent obtained by the surface-crosslinking of water absorbing resin particles in this manner has excellent water absorbing capacity and speed so that it is suitable for use as water absorbing agents for sanitary materials such as disposal diapers or sanitary napkins.

As described above, the crosslinking agent of the invention is suitably used to effect surface-crosslinking of water absorbing resin particles for the production of water absorbing agent, however, according to the invention, the crosslinking agent as mentioned above may also be used as an inner crosslinking agent for the production of water absorbing agent.

In order to obtain a water absorbing agent by using the crosslinking agent of the invention as an inner crosslinking agent, it is preferred that a hydrophilic monomer comprising acrylic acid and/or its salt (neutralized salt) is polymerized in the presence of the crosslinking agent to prepare a water absorbing resin formed of the hydrophilic monomer while crosslinking the water absorbing resin with the crosslinking agent of the invention as the resin is formed. As an alternative, after the polymerization of the hydrophilic monomer or after the neutralization of the resulting water absorbing resin, the crosslinking agent of the invention is added to the water absorbing resin to effect surface-crosslinking of the invention, thereby a water absorbing agent is obtained. The latter method in which after the resulting water absorbing resin is neutralized, the crosslinking agent of the invention is added to the water absorbing resin to effect surface-crosslinking is usually preferred.

As described above, when the crosslinking agent of the invention is used as an inner crosslinking agent, the acrylic acid salt usable includes, for example, an alkali metal salt, an ammonium salt or an amine salt. The acrylic acid salt is used usually in the range of 90–60 mol % in relation to 10–40 mol % of acrylic acid.

As hydrophilic monomers other than acrylic acid and its salt (neutralized salt), there may be used, for example, anionically unsaturated monomers such as methacrylic acid, maleic acid, vinyl sulfonic acid, styrenesulfonic acid, 2-(meth)acrylamide-2-methylpropanesulfonic acid or 2-(meth)acryloylethanesulfonic acid, or their salts, nonionically unsaturated monomers containing hydrophilic groups such as acrylamide, methacrylamide, N-ethyl (meth)acrylamide, N-n-propyl (meth)acrylamide, N-isopropyl (meth)acrylamide, N,N-dimethyl (meth)acrylamide, 2-hydroxyethyl (meth)acrylate, 2-hydroxypropyl (meth)-acrylate, methoxy polyethylene glycol (meth)acrylate, polyethylene glycol mono(meth)acrylate, vinylpyridine, N-vinylpyrrolidone, N-acryloylpiperidine or N-acryloylpyrrolidine, or N,N-dimethylaminoethyl (meth)acrylate, N,N-diethylaminoethyl (meth)acrylate, N,N-dimethylaminopropyl (meth)acrylate, N,N-dimethylaminopropyl (meth)acrylamide or their quaternary salts. Herein the specification, "(meth)acryl" means acryl or methacryl; "(meth)acryloyl" means acryloyl or methacryloyl; and "(meth)acrylate" means acrylate or methacrylate.

In the case the hydrophilic monomers other than acrylic acid and its salt as mentioned above are used, they are used usually in an amount of not more than 30 mol %, preferably in an amount of not more than 10 mol %, in relation to the total of acrylic acid and its salt used.

The polymerization of hydrophilic monomers may be carried out by bulk- or precipitation-polymerization, but from the standpoint of properties of the resulting resins and the easiness with which polymerization is controlled, it is preferred that the polymerization is carried out by aqueous solution polymerization or reversed-phase suspension polymerization.

Usually in the polymerization of hydrophilic monomers, a radical polymerization initiator such as potassium persulfate, ammonium persulfate, sodium persulfate, t-butyl hydroperoxide, hydrogen peroxide or 2,2'-azobis(2-aminodopropane) dihydrochloride is used. In order to promote the decomposition of polymerization initiator, a reducing agent may be used together so as to prepare a redox initiator. The reducing agent usable includes, for example, a (bi)sulfite such as sodium sulfite or sodium bisulfite, L-ascorbic acid (salt), reducing metal (salt) such as a ferrous salt or an amine salt, although not limited to these exemplified.

The polymerization reaction of hydrophilic monomers may be initiated by irradiation thereto of actinic rays such as electron beams or ultraviolet rays. The reaction temperature in the polymerization reaction is not specifically limited, but it is usually in the range of 20–90° C., and the reaction time is also not specifically limited, but it is preferably determined suitably depending on the kind of hydrophilic monomers and polymerization initiators used.

A water absorbing resin is obtained by the polymerization of the hydrophilic monomers as mentioned above. Thus, a water absorbing agent may be obtained by crosslinking the resin by using the crosslinking agent of the invention as an inner crosslinking agent together with an inner crosslinking agent which has been known as such. The known inner crosslinking agent usable includes, for example, N,N-methylenebis (meth)acrylamide, (poly)-ethylene glycol (meth)acrylate, (poly)propylene glycol di(meth)acrylate, trimethylolpropane tri(meth) acrylate, glycerine tri(meth) acrylate, glycerin acrylate methacrylate, ethylene oxide-modified trimethylolpropane tri(meth)acrylate, pentaerythritol hexa(meth)acrylate, triallyl cyanurate, triallyl isocyanurate, triallyl phosphate, triallylamine, polyallyloxyalkane, polymethallyloxyalkane, (poly) ethylene glycol diglycidyl ether, glycerine diglycidyl ether, ethylene glycol, polyethylene glycol, propylene glycol, glycerin, pentaerythritol, ethylenediamine, ethylene carbonate, propylene carbonate, polyethyleneimine and glycidy (meth)acrylate.

When the crosslinking agent of the invention is used as an inner crosslinking agent, it is used usually in an amount of 0.01–20 parts by weight, preferably 0.05–10 parts by weight, more preferably 0.1–5 parts by weight, in relation to 100 parts by weight of the hydrophilic monomer used (i.e., water absorbing resin).

When the crosslinking agent of the invention is used in an amount of less than 0.01 part by weight in relation to 100 parts by weight of water absorbing resin particles, the particles are not crosslinked enough, whereas when the crosslinking agent of the invention is used in an amount of more than 20 parts by weight, the particles are crosslinked at too high a crosslinking density so that the resulting water absorbing gent is inferior either in water absorbing capacity or water absorbing speed.

When the water absorbing agent obtained in this way is gel, it is dried, and then, if necessary, pulverized.

INDUSTRIAL APPLICABILITY OF THE INVENTION

The crosslinking agent of the invention comprises at least one of the first halohydrin compound (A1) and the second halohydrin compound (A2) and contains no epoxy groups in the molecule so that it does not irritate the skin and it is safely used. Furthermore, the crosslinking agent of the invention effects surface-crosslinking of water absorbing resin particles more effectively at lower temperatures than the known crosslinking agent such as alcohols to provide a water absorbing agent which is superior in water absorbing capacity and speed. The crosslinking agent of the invention is also useful as an inner crosslinking agent used for the production of water absorbing agent.

EXAMPLES

The invention will now be described with reference to examples below, but the invention is not limited to the examples. In the following, parts mean parts by weight, and percent means percent by weight. The water absorbing capacity of water absorbing agent produced by using a crosslinking agent of the invention under normal pressures or under a load is measured as follows.

(Water Absorbing Capacity Under Normal Pressures)

1 g of water absorbing agent was placed in a teabag pouch made of nylon of 250 meshes. After immersion in a physiological saline solution (0.9% concentration) for 5 minutes or 30 minutes, the teabag pouch was taken out of the solution, left draining for 15 minutes, and was then weighed to determine the weight increase of teabag pouch after the immersion as the water absorbing capacity under normal pressures after 5 minutes or 30 minutes immersion respectively.

(Water Absorbing Capacity Under a Load)

A plastic tube having an inner diameter of 30 mm and height of 60 mm and a bottom composed of nylon of 250 meshes was set up vertically to form a container. 0.1 g of water absorbing agent was placed in the container and a weight having an outer diameter of 30 mm was put on the water absorbing agent in the container so that a load of 20 g/cm$^2$ was applied to the agent. Then the container was immersed with the bottom downward in a physiological saline solution (0.9% concentration) in a 60 ml in a Petri dish having a diameter of 12 cm for 5 minutes or 30 minutes. The container was taken out of the solution and the weight increase was measured after the immersion. The water absorbing capacity after 5 minutes or 30 minutes under a load was determined as ten times the weight increase.

Examples of Production of Water Absorbing Agent

Production Example 1
(Production of Crosslinking Agent A1a)

182 g (1.0 mol) of sorbitol, 500 g of toluene and 1.8 g of boron trifluoride ether complex (catalyst) were placed in a one liter capacity separable flask and heated with stirring. While maintaining the inside at a temperature of 70–90° C., 277.5 g (3.0 mol) of epichlorohydrin was added dropwise to the mixture. After the addition, the reaction system was found to be a uniform solution. After the addition, the reaction mixture was stirred for another two hours at the same temperature as above, and the reaction was ceased after confirmation of disappearance of epichlorohydrin in the reaction mixture by quantitative titration of epoxy groups. After the reaction, toluene was removed by distillation at reduced pressures to provide a water absorbing agent (A1a) having the general formula (III) wherein $R_3$ is a residual group of sorbitol; X is a chlorine atom; and k=3 and m=3, as a reaction product.

The quantitative analysis of the product showed that the amount of chlorine (amount of chlorine of chlorohydrin group) was 21.9% (theoretical amount of 23.0%) and the yield was found to be 95%.

Production Example 2
(Production of Crosslinking Agent A1b)

106 g (1.0 mol) of diethylene glycol and 0.1 g of boron trifluoride ether complex (catalyst) were placed in a one liter capacity separable flask and heated with stirring. While maintaining the inside at a temperature of 50–70° C., 185 g (2.0 mol) of epichlorohydrin was added dropwise to the mixture. After the addition, the reaction mixture was stirred for another two hours at the same temperature as above, and the reaction was ceased after confirmation of disappearance of epichlorohydrin in the reaction mixture by quantitative titration of epoxy groups, thereby providing a water absorbing agent (A1b) having the general formula (IV) wherein $R_4$ is a hydrogen atom and n=2, as a reaction product.

The quantitative analysis of the product showed that the amount of chlorine (amount of chlorine of chlorohydrin group) was 23.2% (theoretical amount of 24.4%) and the yield was found to be 95%.

Production Example 3
(Production of Crosslinking Agent A1c)

166 g (1.0 mol) of diglycerine and 0.9 g of boron trifluoride ether complex (catalyst) were placed in a one liter capacity separable flask and heated with stirring. While maintaining the inside at a temperature of 50–70° C., 277.5 g (3.0 mol) of epichlorohydrin was added dropwise to the mixture. After the addition, the reaction mixture was found to be a uniform solution. After the addition, the reaction mixture was stirred for another two hours at the same temperature as above, and the reaction was ceased after confirmation of disappearance of epichlorohydrin in the reaction mixture by quantitative titration of epoxy groups, thereby providing a water absorbing agent (A1c) having the general formula (V) wherein one of $R_5$ is a hydrogen atom and the rest three are halohydrin groups Da; and p=1, as a reaction product.

The quantitative analysis of the product showed that the amount of chlorine (amount of chlorine of chlorohydrin group) was 23.3% (theoretical amount of 24.0%) and the yield was found to be 97%.

Production Example 4
(Production of Crosslinking Agent A1d)

165 g (0.3 mol) of maltitol (reduced maltose "Amalty" (syrup), solid content of 75% by weight, available from To a Kasei Kogyo K.K.) was placed in a one liter capacity separable flask and water was removed at reduced pressures. 0.1 g of boron trifluoride ether complex (catalyst) was added and heated with stirring. While maintaining the inside at a temperature of 50–70° C., 185 g (2.0 mol) of epichlorohydrin was added dropwise to the mixture. After the addition, the reaction mixture was stirred for another two hours at the same temperature as above, and the reaction was ceased after confirmation of disappearance of epichlorohydrin in the reaction mixture by quantitative titration of epoxy groups, thereby providing a water absorbing agent (A1d) having about six halohydrin groups in the molecule, as a reaction product.

The quantitative analysis of the product showed that the amount of chlorine (amount of chlorine of chlorohydrin group) was 11.9% (theoretical amount of 13.6%) and the yield was found to be 88%.

Production Example 5
(Production of Crosslinking Agent A2-1)

116 g (1.0 mol) of N,N,N',N'-tetramethyl-1,2-diaminoethane and 200 g of water were placed in a one liter capacity separable flask and the inside was cooled to a temperature of not more than 30° C. Then 203 g (2.0 mol) of concentrated hydrochloric acid was added to the resulting aqueous solution slowly to adjust the pH of the solution in the range of 5 to 7. While maintaining the inside at a temperature of 35–45° C., 185 g (2.0 mol) of epichlorohydrin was added dropwise to the aqueous solution over a period of one hour. After the addition, the reaction mixture was stirred for another two hours at the same temperature as above, and the reaction was ceased after confirmation of disappearance of epichlorohydrin in the reaction mixture by quantitative titration of epoxy groups, thereby providing a water absorbing agent (A2-1) having the general formula (VI) wherein A is an ethylene group; X is a chlorine atom; $R_2$ are all methyl groups; and q=1, as a reaction product.

The quantitative analysis of the product showed that the amount of chlorine (amount of chlorine of chlorohydrin group) was 19.5% (theoretical amount of 20.1%) and the yield was found to be 97%.

Production Example 6
(Production of Crosslinking Agent A2-2)

172 g (1.0 mol) of N,N,N',N'-tetramethyl-1,6-diaminohexane and 300 g of water were placed in a one liter capacity separable flask and the inside was cooled to a temperature of not more than 30° C. Then 203 g (2.0 mol) of concentrated hydrochloric acid was added to the resulting aqueous solution slowly to adjust the pH of the solution in the range of 5 to 7. While maintaining the inside at a temperature of 35–45° C., 185 g (2.0 mol) of epichlorohydrin was added dropwise to the aqueous solution over a period of one hour. After the addition, the reaction mixture was stirred for another two hours at the same temperature as above, and the reaction was ceased after confirmation of disappearance of epichlorohydrin in the reaction mixture by quantitative titration of epoxy groups, thereby providing a water absorbing agent (A2-2) having the general formula (VI) wherein A is a hexamethylene group; X is a chlorine atom; $R_2$ are all methyl groups; and q=1, as a reaction product.

The quantitative analysis of the product showed that the amount of chlorine (amount of chlorine of chlorohydrin group) was 16.1% (theoretical amount 16.5%) and the yield was found to be 98%.

Production Example 7
(Production of Crosslinking Agent A2-3)

180 g of aqueous solution of dimethylamine (aqueous solution of 2.0 mol of dimethylamine) was placed in a one liter capacity separable flask and heated with stirring. While maintaining the inside at a temperature of 50–70° C., 277.5 g (3.0 mol) of epichlorohydrin was added dropwise to the mixture. After the addition, the reaction mixture was stirred for another two hours at the same temperature as above, and the reaction was ceased after confirmation of disappearance of epichlorohydrin in the reaction mixture by quantitative titration of epoxy groups, thereby providing a crosslinking agent (A2-3) having the general formula (XIII) wherein X is a chlorine atom; $R_2$ are all methyl groups; and s=1, as a reaction product.

The quantitative analysis of the reaction mixture showed that the amount of chlorine (amount of chlorine of chlorohydrin group) was 14.2% (theoretical amount of 15.5%) and the yield was found to be 92%.

Example 1
(Production of Water Absorbing Resin Particles)

40 g of acrylic acid was placed in a 500 ml capacity separable flask provided with a stirrer, a reflux condenser and a nitrogen gas inlet tube. An aqueous solution of 53 g of sodium hydroxide having a purity of 95% in 17.9 g water was added dropwise into the flask with stirring under cooling thereby neutralizing the acrylic acid. Nitrogen gas was blown into the resulting aqueous solution for 30 minutes to replace the inside atmosphere by nitrogen gas.

0.4 g of 1% aqueous solution of ammonium persulfate and 0.2 g of 0.5% aqueous solution of N,N'-methylene bisacrylamide into both of which nitrogen gas had been blown were added to the aqueous solution of the neutralized acrylic acid and stirred thoroughly. After the stirring was ceased, the flask was immersed in a warm water bath at a temperature of 60° C. to start polymerization. After 10 minutes from the start of polymerization, the inside temperature reached a maximum of 80° C., and then the inside temperature decreased to 60° C. The reaction mixture was stirred for another one hour at the same temperature, cooled to room temperature, and the polymerization was completed.

The content inside was taken out of the flask, crushed to small pieces, dried for two hours at a temperature of 105° C., pulverized with a mill and sieved, thereby providing 60 mesh minus products as water absorbing resin particles used in the following.
(Production of Water Absorbing Agent by Surface-Crosslinking of Water Absorbing Resin Particles)

0.03 g of crosslinking agent (A1a) and 0.03 g of crosslinking agent (A2-1) were diluted with 10 g of water to prepare an aqueous solution.

The water absorbing resin particles were placed in a double-arm type kneader and, with stirring, the aqueous solution of crosslinking agent was sprayed thereon, and then the mixture was mixed thoroughly. The thus treated water absorbing resin particles were heated at a temperature of 105° C. for 30 minutes, thereby providing a water absorbing agent of the invention, that is, surface-crosslinked particles of water absorbing resin. The properties of the water absorbing agent are shown in Table 1.

Example 2

0.03 g of crosslinking agent (A1b) and 0.03 g of crosslinking agent (A2-1) were used and the otherwise in the same manner as in Example 1, a water absorbing agent was prepared. The properties of the water absorbing agent are shown in Table 1.

Example 3

0.03 g of crosslinking agent (A1c) and 0.03 g of crosslinking agent (A2-1) were used and the otherwise in the same manner as in Example 1, a water absorbing agent was prepared. The properties of the water absorbing agent are shown in Table 1.

Example 4

0.03 g of crosslinking agent (A1a) and 0.03 g of crosslinking agent (A2-2) were used and the otherwise in the same manner as in Example 1, a water absorbing agent was prepared. The properties of the water absorbing agent are shown in Table 1.

Example 5

0.03 g of crosslinking agent (A1b) and 0.03 g of crosslinking agent (A2-2) were used and the otherwise in the same manner as in Example 1, a water absorbing agent was prepared. The properties of the water absorbing agent are shown in Table 1.

Example 6

0.03 g of crosslinking agent (A1c) and 0.03 g of crosslinking agent (A2-2) were used and the otherwise in the same manner as in Example 1, a water absorbing agent was prepared. The properties of the water absorbing agent are shown in Table 1.

Example 7

0.06 g of crosslinking agent (A1a) was used and the otherwise in the same manner as in Example 1, a water absorbing agent was prepared. The properties of the water absorbing agent are shown in Table 1.

Example 8

0.06 g of crosslinking agent (A2-1) was used and the otherwise in the same manner as in Example 1, a water absorbing agent was prepared. The properties of the water absorbing agent are shown in Table 1.

Example 9

0.06 g of crosslinking agent (A1d) was used and the otherwise in the same manner as in Example 1, a water absorbing agent was prepared. The properties of the water absorbing agent are shown in Table 2.

Example 10

0.06 g of crosslinking agent (A2-3) was used and the otherwise in the same manner as in Example 1, a water absorbing agent was prepared. The properties of the water absorbing agent are shown in Table 2.

Example 11

0.06 g of crosslinking agent (A1c) was used and the otherwise in the same manner as in Example 1, a water absorbing agent was prepared. The properties of the water absorbing agent are shown in Table 2.

Example 12

0.03 g of crosslinking agent (A1d) and 0.03 g of crosslinking agent (A2-2) were used and the otherwise in the same manner as in Example 1, a water absorbing agent was prepared. The properties of the water absorbing agent are shown in Table 2.

Example 13

0.06 g of crosslinking agent (A2-2) was used and the otherwise in the same manner as in Example 1, a water absorbing agent was prepared. The properties of the water absorbing agent are shown in Table 2.

Example 14

0.03 g of crosslinking agent (A1d) and 0.03 g of crosslinking agent (A2-3) were used and the otherwise in the same manner as in Example 1, a water absorbing agent was prepared. The properties of the water absorbing agent are shown in Table 2.

Example 15

(Production of Water Absorbing Resin Particles)

400 ml of cyclohexane and 0.625 g of ethylcellulose (dispersant) were placed in a one liter capacity four necked flask provided with a stirrer, a reflux condenser, a dropping funnel and a nitrogen gas inlet tube. Nitrogen gas was blown into the mixture to remove oxygen dissolved in the mixture and then heated to a temperature of 75° C.

102.0 g of acrylic acid was placed in another flask and diluted with 25.5 g of ion-exchanged water to prepare an aqueous solution, and then 140 g of 30% aqueous solution of sodium hydroxide was added to the aqueous solution of acrylic acid with cooling externally, thereby to neutralizing the acrylic acid. An aqueous solution of 0.204 g of potassium persulfate in 7.5 g of water was added to the aqueous solution of the neutralized acrylic acid, and then nitrogen gas was blown into the mixture to remove oxygen dissolved in the mixture.

The thus prepared content in the flask was added dropwise to the mixture of cyclohexane and ethyl cellulose in the four necked flask over a period of one hour, thereby effecting the polymerization of acrylic acid.

After the polymerization, about 60% of water was removed from the reaction mixture as a cyclohexane azeotrope. The reaction was then cooled, and the reaction product was filtered with a 325 mesh wire sieve to separate the resulting polymer product. The polymer was dried in vacuo at a temperature of 80° C. to prepare water absorbing resin particles used in the following.

Example 1, a water absorbing agent was prepared. The properties of the water absorbing agent are shown in Table 2.

Comparative Example 2

0.06 g of diethylene glycol was used as a crosslinking agent, and otherwise in the same manner as in Example 1, a water absorbing agent was prepared. The properties of the water absorbing agent are shown in Table 2.

TABLE 1

| | Crosslinking Agent | | Absorbing Capacity under a Load | | Absorbing Capacity under no Load | |
|---|---|---|---|---|---|---|
| | A1 | A2 | After 5 minutes | After 30 minutes | After 5 minutes | After 30 minutes |
| Example 1 | A1a | A2-1 | 36 | 43 | 15 | 22 |
| Example 2 | A1b | A2-1 | 33 | 40 | 16 | 22 |
| Example 3 | A1c | A2-1 | 31 | 40 | 13 | 21 |
| Example 4 | A1a | A2-2 | 30 | 40 | 13 | 20 |
| Example 5 | A1b | A2-2 | 32 | 40 | 13 | 22 |
| Example 6 | A1c | A2-2 | 32 | 40 | 14 | 21 |
| Example 7 | A1a | — | 30 | 38 | 12 | 19 |
| Example 8 | — | A2-1 | 31 | 36 | 14 | 21 |
| Example 9 | A1d | — | 33 | 38 | 13 | 22 |

TABLE 2

| | Crosslinking Agent | | Absorbing Capacity under a Load | | Absorbing Capacity under no Load | |
|---|---|---|---|---|---|---|
| | A1 | A2 | After 5 minutes | After 30 minutes | After 5 minutes | After 30 minutes |
| Example 10 | — | A2-3 | 32 | 40 | 13 | 23 |
| Example 11 | A1c | — | 30 | 40 | 12 | 20 |
| Example 12 | A1d | A2-2 | 34 | 40 | 14 | 22 |
| Example 13 | — | A2-2 | 32 | 37 | 15 | 22 |
| Example 14 | A1d | A2-3 | 33 | 42 | 16 | 24 |
| Example 15 | A1a | A2-1 | 34 | 42 | 15 | 24 |
| Comparative Example 1 | EX-810*) | | 30 | 48 | 16 | 24 |
| Comparative Example 2 | Diethylene glycol | | 16 | 28 | 10 | 14 |

*)Ethylene glycol diglycidyl ether available from Nagase Chemtex Corporation (Production of Water Absorbing Agent)

0.03 g of crosslinking agent (A1a) and 0.03 g of crosslinking agent (A2-1) were diluted with 10 g of water to prepare an aqueous solution.

The water absorbing resin particles were placed in a double-arm type kneader and, with stirring, the aqueous solution of crosslinking agent was sprayed thereon, and then the mixture was mixed thoroughly. The thus treated water absorbing resin particles were heated at a temperature of 105° C. for 30 minutes, thereby providing a water absorbing agent of the invention, that is, surface-crosslinked particles of water absorbing resin. The properties of the water absorbing agent are shown in Table 2.

Comparative Example 1

0.06 g of ethylene glycol diglycidyl ether (EX-810 available from Nagase Chemtex Corporation) was used as a crosslinking agent, and otherwise in the same manner as in

What is claimed is:

1. A crosslinking agent for use in the crosslinking of water absorbing resin particles which comprises at least one halohydrin compound (A) selected from the group consisting of:

(A1) a first halohydrin compound (A1) which has in the molecule at least two halohydrin groups D having the general formula (I)

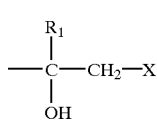

(I)

wherein $R_1$ is a hydrogen atom or an alkyl group, and X is chlorine atom or bromine atom; and (A2) a second halohydrin compound (A2) which has in the molecule at least two said halohydrin groups D and at least one ammonium group M having the general formula (II)

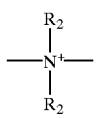 (II)

wherein $R_2$ is independently a hydrocarbon group of 1–4 carbon atoms or a benzyl group.

2. The crosslinking agent according to claim 1 in which the first halohydrin compound (A1) or the second halohydrin compound (A2) or both of these have a halohydrin group (Da) represented by the general formula (Ia)

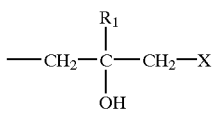 (Ia)

wherein $R_1$ is a hydrogen atom or an alkyl group, and X is a chlorine atom or a bromine atom.

3. The crosslinking agent according to claim 2 in which the first halohydrin compound (A1) is a compound (A1a) represented by the general formula (III)

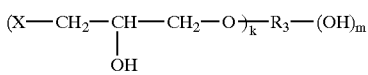 (III)

wherein $R_3$ is an aliphatic hydrocarbon group having 2–10 carbon atoms and a valence of (k+m); X represents a chlorine atom or a bromine atom; and k and m are integers satisfying the conditions: $2 \leq k \leq 6$, $0 \leq m \leq 4$, and $2 \leq k+m \leq 6$.

4. The crosslinking agent according to claim 2 in which the first halohydrin compound (A1) is a compound (A1b) represented by the general formula (IV)

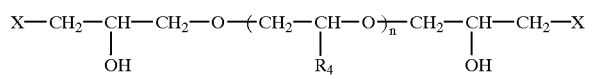 (IV)

wherein $R_4$ is a hydrogen atom or an alkyl group; X represents a chlorine atom or a bromine atom; and n is an integer of 1–50.

5. The crosslinking agent according to claim 2 in which the first halohydrin compound (A1) is a compound (A1c) represented by the general formula (V)

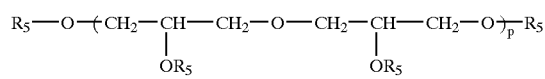 (V)

wherein $R_5$ is independently a hydrogen atom or a halohydrin group Da, and at least two of $R_5$ are halohydrin groups Da; and p is an integer of 1–10.

6. The crosslinking agent according to claim 2 in which the first halohydrin compound (A1) is a compound (A1d) which has at least two halohydrin groups Da in the molecule and is obtained by reacting a sugar alcohol derived from oligosaccharides with an epihalohydrin.

7. The crosslinking agent according to claim 2 in which the second halohydrin compound (A2) is a compound which has quaternary ammonium groups and two or more halohydrin groups Da in the molecule, and which is represented by the general formula (VI)

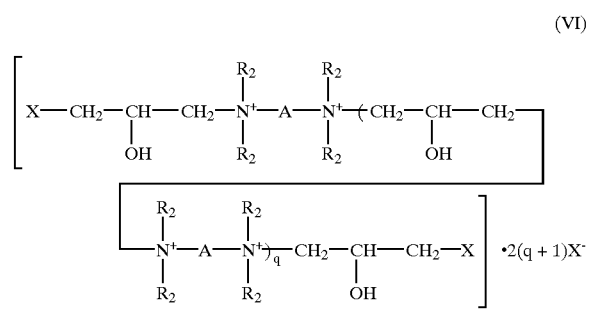 (VI)

wherein A is an alkylene group of 2–8 carbon atoms; or a divalent group N represented by the general formula (VII)

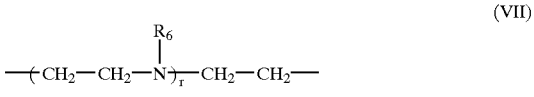 (VII)

wherein $R_6$ is a hydrocarbon group of 1–4 carbon atoms or a benzyl group, and r is an integer of 1–3; or a divalent group O represented by the formula (VIII)

 (VIII)

and wherein $R_2$ is each independently a hydrocarbon group of 1–4 carbon atoms or a benzyl group; X is a chlorine atom or a bromine atom; and q is an integer of 0–5.

8. The crosslinking agent according to claim 1 which comprises 10–90% by weight of the first halohydrin compound (A1) and 90–10% by weight of the second halohydrin compound (A2).

9. The crosslinking agent according to claim 1 which comprises 40–60% by weight of the first halohydrin compound (A1) and 60–40% by weight of the second halohydrin compound (A2).

10. A water absorbing agent obtained by adding 0.01–20 parts by weight of crosslinking agent according to claim 1 to water absorbing resin particles having carboxylic acid groups and/or carboxylic acid salt groups, heating and crosslinking the particles.

11. A method for production of water absorbing agent which comprises adding 0.01–20 parts by weight of crosslinking agent according to claim 1 to water absorbing resin particles having carboxylic acid groups and/or carboxylic acid salt groups, heating and crosslinking the particles.

* * * * *